United States Patent Office 3,449,466
Patented June 10, 1969

3,449,466
COMPOSITIONS COMPRISING INTERPOLYMERS OF ALDEHYDE MODIFIED AMIDES AND POLYVINYLIDENE FLUORIDE
Gene Gerek, Cheswick, Pa., and Louis K. Buell, Delaware, Ohio, assignors to PPG Industries, Inc., a corporation of Pennsylvania
No Drawing. Continuation-in-part of application Ser. No. 515,477, Dec. 21, 1965. This application May 26, 1967, Ser. No. 641,480
Int. Cl. C08f *29/32;* B32b *27/30*
U.S. Cl. 260—826
13 Claims

ABSTRACT OF THE DISCLOSURE

Resinous compositions useful as coating compositions comprise an aldehyde-modified unsaturated carboxylic acid amide interpolymer and a polymer of vinylidene fluoride. Vinylidene fluoride homopolymers and copolymers containing at least 95 percent vinylidene fluoride are preferred, as are alcohol-etherified amide interpolymers having amido hydrogens substituted by the group

Preferred amide interpolymers contain acrylonitrile or methacrylonitrile. The compositions may optionally contain other resins, such as epoxide resins, organopolysiloxane resins, etc. Coatings from these compositions have outstanding durability, flow, adhesion and flexibility.

---

This application is a continuation-in-part of copending application Ser. No. 515,477, filed Dec. 21, 1965, now abandoned.

This invention relates to useful and novel resinous materials and pertains more particularly to coating compositions comprising an aldehyde-modified unsaturated carboxylic acid amide interpolymer and a polymer of vinylidene fluoride.

Interpolymers of unsaturated carboxylic acid amides, and especially aldehyde-modified, etherified interpolymers of amides and other ethylenically unsaturated monomers, such as those disclosed in U.S. Patent 3,307,963, have been utilized extensively in coating compositions. For example, they are employed as resinous vehicles for enamels and other thermosetting compositions. When so used, such interpolymers give very tough and mar-resistant films having excellent chemical resistance.

Similarly, coating compositions can be made from polymers of vinylidene fluoride and the resultant coatings have excellent durability and flexibility. An important disadvantage of such coatings, however, is that they do not readily adhere to metal surfaces. For this reason, the polymers were primarily employed, at least initially, to make free films. These films were usually laminated to metal or wood and could not be used in conventional coating operations, such as, for example, roll coating or spray coating. More recently, techniques have been devised which enable the polymers to be so applied but the required adhesion is obtained only by using temperatures and exposure times greatly in excess of those used in conventional coating operations.

It has now been discovered that outstanding coating compositions are obtained by combining aldehyde-modified unsaturated carboxylic acid amide interpolymers and polymers of vinylidene fluoride. The resultant coatings possess excellent adhesion, as well as other desirable properties, and are well-suited for use in all conventional coating operations.

Coatings made from the compositions of this invention have several superior properties, in some cases surpassing the properties of the excellent coatings described above comprising the amide interpolymer alone. For example, the outstanding adhesion of these coatings during elongation almost completely eliminates delamination during severe forming operations, a serious and common coating failure which occurs when the cured film separates from the substrate during fabrication of articles from the coated metal. Furthermore, the outstanding adhesion and other properties of these coatings are attained with curing schedules employing conventional temperatures and exposure times.

The coating compositions of this invention also possess superior flow characteristics, which are a measure of the ability of film to settle on a metal surface. This property is important in order to more easily obtain smooth-surfaced coatings without the necessity for specialized application techniques. Consequently, coatings made from the compositions of this invention can be made utilizing conventional application methods as well as conventional curing schedules.

Another advantage is the excellent compatibility between the vinylidene fluoride and amide interpolymer components of the composition. The amide interpolymer resins, mentioned above, have well-known pigment wetting abilities. When these resins are used in combination with polymers of vinylidene fluoride not only is this pigment-wetting ability retained, but an overall homogeneous solution is obtained. Thus, coating compositions utilizing the vehicles herein can be simply and inexpensively prepared. Many of the desirable qualities of the compositions of this invention are believed to be a result of this exceptional mutual affinity of the two components.

Still other desirable properties of coatings made from the compositions of this invention include their excellent appearance, salt-fog resistance and exceptionally high heat stability, as well as flexibility, excellent impact resistance, mar resistance, water resistance, and other such advantageous features.

The desirable properties of the compositions of this invention make them useful in a number of varied applications. Their superior heat stability, for example, makes them well-suited for use as exterior drum linings where high temperatures are involved. They can also be utilized as exterior finishes on metal surfaces, such as aluminum siding, and can be used as table top coatings, refrigerator interior coatings, and in similar applications wherein their unique protective and decorative properties are utilized.

The amide interpolymer component of the compositions of this invention can be any aldehyde-modified interpolymer of an unsaturated carboxylic acid amide; the aldehyde-modified interpolymer is preferably at least partially etherified. Aldehyde-modified amide interpolymers are obtained by polymerizing an unsaturated amide and at least one ethylenically unsaturated monomer and reacting the initial product of the polymerization with an aldehyde. Etherification is carried out by further reaction of the aldehyde-modified interpolymer with an alcohol. Alternatively, aldehyde-modified interpolymers are produced by interpolymerizing an aldehyde-modified amide, such as an alkylol amide, which may be then etherified, if desired, or by employing an N-alkylol amide or an N-alkoxyalkyl amide.

In any case, the aldehyde-modified, etherified amide interpolymer contains amido groups having at least one hydrogen atom replaced by the structure:

where R is hydrogen or a hydrocarbon radical and $R_1$ is hydrogen in unetherified groups or an organic radical derived by removing the hydroxyl group from the etherifying alcohol.

Methods of producing N-alkoxyalkyl-substituted unsaturated carboxylic acid amides such as N-butoxymethyl acrylamide, which amides are quite useful to produce the amide interpolymers employed herein, are disclosed in U.S. Patent Nos. 3,079,434 and 3,087,965. When these and similarly substituted unsaturated carboxylic acid amides are polymerized, the resulting reaction product contains the aforesaid structure without any further treatment.

After etherification, the amide interpolymer contains amido groups having a hydrogen atom replaced by the structure:

where R is hydrogen when the aldehyde employed is formaldehyde and an alkyl radical when other aliphatic aldehydes are used. $R_1$ is the radical derived by removing a hydroxyl group from the etherifying alcohol, i.e., an organic radical. $R_1$ in the etherified groups can be, for example, alkyl or aryl. The terms "alkyl" and "aryl," as employed herein, are to be construed broadly; the groups represented by $R_1$ are preferably alkyl radicals containing from 1 to 8 carbon atoms, but may include other substituents and functional groups which do not substantially affect the properties of the product. Thus, $R_1$ may include unsaturated linkages, ether linkages, halogens, and other substituents, or it may be cyclic.

Satisfactory products may in some instances be obtained with none or only a very small part of the aldehyde-modified amide groups having been etherified, in some instances 5 percent or less. However, it is usually desirable that at least about 50 percent of these groups be etherified, since many compositions having less than about 50 percent of the groups etherified have a tendency to be somewhat less stable and subject to gelation.

Butanol is a preferred alcohol for use in the etherification, although any monohydric alcohol, such as methanol, ethanol, propanol, pentanol, octanol, decanol and other alkanols containing up to about 20 or more carbon atoms, may also be employed, as many aromatic alcohols, such as benzyl alcohol; or cyclic alcohols, such as cyclohexanol; or the mono-ethers of glycols, such as ethylene glycol monobutyl ether, diethylene glycol monobutyl ether and other mono-ethers of alkylene glycols and their derivatives, and similar alcohols; or substituted alcohols, such as 3-chloropropanol.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and imide derivatives, such as N-carbamyl maleimide, may also be utilized. From about 2 percent to about 50 percent by weight of amide is ordinarily included in the interpolymer.

At least one other copolymerizable unsaturated monomer is then interpolymerized with the unsaturated carboxylic acid amide; any copolymerizable ethylenically unsaturated monomer can be so utilized. Such other monomers include monoolefinic acid diolefinic hydrocarbons, halogenated monoolefinic acid diolefinic hydrocarbons, unsaturated esters of organic and inorganic acids, esters of unsaturated acids, nitriles, unsaturated acids, and the like. The interpolymer compositions described in U.S. Patent 3,307,963 are excellent examples of the preferred type of amide polymers utilized in the instant invention, and the compounds disclosed therein illustrate the numerous comonomers which can be used and the manner of carrying out the interpolymerization.

Preferred coating compositions of the invention are obtained with interpolymers containing interpolymerized acrylonitrile or methacrylonitrile, or both. The use of such interpolymers provides optimum properties for many uses, especially with coatings to be applied on galvanized steel and similar substrates. From about 2 percent to about 30 percent of nitrile monomer is usually included in these preferred interpolymers, with the balance being amide and one or more ethylenically unsaturated monomer(s). Another preferred type of interpolymer contains an appreciable proportion of lower alkyl methacrylate, e.g., 10 to 40 percent of methyl methacrylate.

In carrying out the polymerization reaction, a catalyst is ordinarily utilized, which can be peroxygen compound such as cumene hydroperoxide, lauroyl peroxide, benzoyl peroxide, or a similar compound. Azo compounds, such as alpha,alpha'-azo-bisisobutyronitrile, may also be used, as may redox catalyst systems. In many instances it is desirable to add a chain-modifying agent, such as a mercaptan, to the polymerization mixture.

The polymerization to produce the amide interpolymer is typically carried out by admixing the amide, the other monomer or monomers, and the catalyst and chain-modifying agent, if any, in the solvent, and refluxing the resulting solution for a time sufficient to obtain the desired conversion. Ordinarily, the polymerization will be complete in about 1 to 16 hours. It is often desirable to add the catalyst in increments as the polymerization progresses, and good agitation and careful temperature control are also desirable because of the very rapid reaction rate and because the reaction is highly exothermic.

When necessary to produce the desired structures, the carboxylic acid amide is reacted with an aldehyde, preferably in the presence of an alcohol. Formaldehyde, in solution in water (formalin) or in an alkanol such as butanol, or a formaldehyde-yielding substance such as paraformaldehyde, trioxymethylene, or hexamethylenetetramine, is preferred, but other aldehydes, including acetaldehyde, butyraldehyde, and the like, can be used. It is ordinarily preferred to utilize about two equivalents of aldehyde for each amido group present in the interpolymer, although this ratio may be raised or lowered considerably if desired.

To produce the preferred aldehyde-modified and etherified products, the reaction is usually carried out by refluxing the aldehyde, alcohol and interpolymer in the presence of a mild acid catalyst, such as maleic anhydride. Other acid catalysts, such as oxalic acid, hydrochloric acid, or sulfuric acid, may also be employed, although there is some possibility of gelation occurring if the acid catalyst is too strongly acidic. The quantity of catalyst utilized may be varied widely; the more acidic the reaction medium, the greater the amount of etherification which will occur.

As noted above, similar polymeric materials may also be obtained by polymerizing a modified amide, such as an N-alkylolamide or an N-alkoxyalkyl amide. The polymerization utilizing an N-alkylolamide or an N-alkoxyalkyl amide is carried out in substantially the same manner as when the unmodified amide is interpolymerized.

In addition to the amide interpolymer described above, the other essential component of the compositions of this invention is a polymer of vinylidene fluoride. These polymers may be prepared by polymerization methods well-known in the art, such as are taught in U.S. Patents 2,435,537 and 3,012,021.

While the new compositions described herein preferably employ the homopolymer of vinylidene fluoride, they are also applicable to copolymers of vinylidene fluoride containing a major proportion of vinylidene fluoride. Such copolymers contain a major proportion and usually contain at least about 95 mol percent of vinylidene fluoride. Suitable comonomers are the halogenated ethylenes, such as symmetrical dichlorodifluoroethylene, 1,1,2-trifluoro-2-chloroethylene, tetrafluoroethylene, vinyl chloride and others. Whenever the term "polymer of vinylidene fluoride" is used in this application, it refers to the homopolymer or the copolymer as described above.

The proportions of the two components of this invention are not ordinarily critical, in that improved properties to some extent are attained with essentially any amount of either component. Generally, however, there are employed amounts of the polymer of vinylidene fluoride component varying from about 25 percent to about 98 percent, based on the total weight of the vinylidene flouride polymer and the amide interpolymer, with the amide interpolymer component present in amounts between about 2 percent and about 75 percent by weight. A preferred coating composition is obtained when the two components are present in equal amounts.

No special expedients are necessary in formulating the coating compositions of this invention. For example, they may be prepared simply by admixing a solution of the amide interpolymer with a solution of the polymer of vinylidene fluoride; or the polymer of vinylidene fluoride, as a powder, may be ground into the amide interpolymer solution, or even added during the interpolymerization. No heating is required as the components may be blended readily in the cold state. The solvents are similarly not critical except that the solvent should dissolve both components in the concentration desired. Usable solvents include cyclohexanone, butyrolactone, isophorone, diacetone alcohol, and mono- and diethylene glycol alkyl ethers such as, for example, diethylene glycol monobutyl ether and ethylene glycol monobutyl ether.

It is not known with certainty whether a reaction between the two components occurs, but it is possible that reaction to some extent takes place either during the formulation of the composition or during curing of the coatings produced therefrom.

The compositions described can be used as such to make clear films, but more usually they are utilized as the vehicle in compositions in which there is incorporated a pigment composition. Essentially any conventional pigment can be used; the pigment composition may include, for example, titanium dioxide, carbon black, talc, baryltes, zinc sulfate, strontium chromate, barium chromate, ferric iron oxide, as well as color pigments such as cadmium yellow, cadmium red, phthalocyanine blue, chromic yellow toluidine red, hydrated iron oxide, and the like. In pigmented compositions, the pigment-to-binder ratio is preferably between 0.5 to 1 and 1 to 1.

The coating compositions herein are ordinarily produced by first dispersing the pigment or pigments in the amide interpolymer component, usually by grinding, in accordance with well-known practice, and subsequently combining with the polymer of vinylidene fluoride. In some cases, the pigment may be dispersed after the two components have been combined but it is usually not desirable to disperse the pigment in the polymer of vinylidene fluoride component alone.

Various additive materials can also be included in the coating composition if desired. These may be, for instance, stabilizers, flow agents, slip agents, and the like. Minor amounts of other resins can also be included, for example, epoxide resins, such as the polyglycidyl ethers of polyhydric compounds, e.g., the diglycidyl ether of Bisphenol A; vinyl halide resins, such as polyvinyl chloride and vinyl chloridevinyl acetate copolymers; amine resins, such as hexakis(methoxymethyl) melamine and other condensation products of formaldehyde with urea, melamine or benzoguanamine; nitrocellulose; hydrocarbon resins, such as polyethylene; and polyesters, such as glycerol phthalate resins.

Organosilicon resins, such as those described in U.S. Patent 3,261,881, can also be included in the compositions therein. These generally are organopolysiloxanes of the unit formula

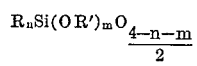

where R is a monovalent organic radical bonded to silicon by a carbon-to-silicon bond, R' is hydrogen, alkyl of 1 to 20 carbon atoms, aryl or acyl of 1 to 8 carbon atoms, the value of $n$ is 0.5 to 1.9, the value of $m$ is 0.01 to 2.5, and the value of $n+m$ is between 0.51 and 3. R and R' can be any radical indicated, numerous specific groups being mentioned in the above patent (the disclosure of which is incorporated herein by reference).

The above added resins can be either added to the resinous composition or the resin or its components can be included in the mixture used to form the amide interpolymer. This latter procedure provides in many cases interreaction between the amide interpolymer and the added resin or resin components.

Such interreaction is particularly desirable with organosilicon resins, and for this reason, reactive types of organopolysiloxanes are desirably employed. Interreaction with such organopolysiloxanes can be achieved, to some extent at least, by including reactive sites such as hydroxyl groups in the amide interpolymer, for example, by including in the interpolymer a copolymerizable monomer containing a hydroxyl group, e.g., a hydroxylalkyl ester monomer, such as hydroxyethyl acrylate, 2-hydroxypropyl methacrylate, or the like.

Another method is to first react the organopolysiloxane with a compound containing both a polymerizable group and a group, such as a hydroxyl, reactive with the organopolysiloxane. The hydroxyalkyl esters mentioned above are examples of such compounds. The organosilicon condensate thus formed is utilized as a "monomer" in the preparation of the amide interpolymer, thereby producing an organosilicon-modified interpolymer.

Still another means of incorporating an organopolysiloxane is to prereact it with an unsaturated organoalkoxysilane such as those of the formula

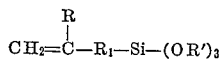

where R is hydrogen or an organic radical, R' is as above, and $R_1$ is a divalent radical, e.g., methylene or a similar alkylene radical. The product contains a polymerizable group and is interpolymerized with the amide and other monomer or monomers.

The use of organosilicon-modified amide interpolymers provides coatings having outstanding durability but usually with somewhat lowered flexibility.

In ordinary usage of the coating compositions of this invention, they are applied to the article to be coated by brushing, spraying, roll coating, or similar conventional technique, and then baked to form a hard, adherent film. Typical baking schedules include 350° F. for 30 minutes to 500° F. for 1 minute.

There are set forth below several examples which illustrate the nature and properties of the coating compositions of the invention. However, the invention should not be considered as being limited to their details. All parts and percentages in the examples and throughout this specification are based on resin solids content and are by weight unless otherwise specified.

EXAMPLE I

An aldehyde-modified acrylamide interpolymer was prepared from the following:

| | Parts by weight |
|---|---|
| Acrylamide | 92.0 |
| Methacrylic acid | 46.0 |
| Acrylonitrile | 368.0 |
| Ethyl acrylate | 1335.0 |
| Butanol | 460.0 |
| Xylene | 460.0 |
| Tertiary dodecyl mercaptan (chain-modifying agent) | 55.2 |
| t-Butylperoxyisopropyl carbonate (catalyst) | 2.3 |

The foregoing mixture was heated to 205° C. over a

1½ hour period, at which time refluxing began. After ½ hour of refluxing, 21.7 parts of aromatic naphtha (boiling range 187° C. to 205° C.) and 1.1 parts of the catalyst were added. After each of two successive 1-hour periods, the same amounts of the catalyst and aromatic naphtha were added. After each of the next two 1-hour intervals, the same amount of aromatic naphtha was used but the amount of catalyst added was 0.6 part. After a final 1-hour of refluxing, the mixture was cooled to 220° C. and 93.0 parts of 40 percent formaldehyde in butanol, 2.4 parts of maleic anhydride and 313 parts of aromatic naphtha were added. Immediately thereafter, another 21.7 parts of aromatic naphtha was added, along with 0.6 part of catalyst. Azeotropic distillation was then conducted for 3 hours, removing 23 parts of water, after which 484 parts of aromatic naphtha were added.

The product of the above preparation had a solids content of 49.8 percent, Gardner-Holdt viscosity of Z—Z₁, color (Gardner) of 6⁺ and an acid number of 7.6.

A coating composition was prepared by thoroughly blending, at room temperature, 5 parts of the amide interpolymer prepared above with 95 parts of poly(vinylidene fluoride) and 150 parts of isophorone. The poly(vinylidene fluoride) had a melting point of 160° C. to 165° C. and a high molecular weight, as indicated by its plasticity number of 3020. The "plasticity number" is an empirical index indicating relative molecular weight and is used because of the difficulty in obtaining a true solution of the polymer in order to make absolute molecular weight determinations. The resultant composition had a total resin solids content of 40 percent.

The outstanding adhesion during elongation of the present compositions was illustrated using aluminum panels coated with the above coating composition, evaluated by comparison with two other panels, similarly prepared except that one was coated with a 100 percent poly(vinylidene fluoride) composition and the other with the amide interpolymer composition described above. The panels were baked for 60 seconds at 500° F. and subjected to an elongation-adhesion test known as the Ericksen bump test. In this test, the coating is scored and the coated panel is stretched in the scored area. A pressure-sensitive adhesive tape is then applied to the elongated coating and rapidly pulled off the panels. If the coating sticks to the tape instead of the panel when the tape is removed, the adhesion is considered to be poor. Excellent adhesion results when none of the coating is pulled off the panel. The results follow.

| Coating composition containing: | Elongation-adhesion |
|---|---|
| 100 percent poly(vinylidene fluoride) | Poor. |
| 100 percent amide interpolymer | Fair. |
| 5 percent amide interpolymer, 95 percent poly(vinylidene fluoride) | Excellent. |

EXAMPLE II

This example illustrates the preparation of another coating composition of this invention and the superior heat stability of the resultant coatings.

Twenty parts of the amide interpolymer employed in Example I were blended at room temperature with 80 parts of poly(vinylidene fluoride) (as in Example I) and 150 parts of butyrolactone. The composition had a resin solids content of 40 percent. A white pigment, $TiO_2$, was dispersed in the composition in a pigment-to-binder ratio of 0.6 to 1.

The coating composition above was then applied to a panel and tested along with a panel coated with a composition containing 100 percent poly(vinylidene fluoride), but otherwise essentially identical to the first composition. The coatings were cured at 60 seconds exposure and a temperature of 500° F. After curing, the panels were tested for discoloration or overbaking, by further baking the coated panels for the same length of time. In most cases, a gradual yellowing of a white coating occurs upon continuous overbake, and the panels in this test were graded from excellent to poor, based on their ability to resist such color impairment. The results were as follows.

| | 500° F. Bake (minutes) | | | |
|---|---|---|---|---|
| | 1 | 3 | 5 | 10 |
| Coating Composition Containing: | | | | |
| 100 percent poly(vinylidene fluoride) | Good | Fair Poor | Fair-Poor | Poor. |
| 80 percent poly(vinylidene fluoride) 20 percent amide interpolymer | Excellent | Excellent | Good | Fair. |

EXAMPLE III

This example illustrates the preparation of another coating composition of this invention and the superior qualities of film appearance, fabrication, corrosion resistance and water resistance which the resultant coatings possess.

Example II was repeated, except that 50 parts of the amide interpolymer and 50 parts of poly(vinylidene fluoride) were employed, and the pigment was dispersed in the composition in a pigment-to-binder ratio of 0.8 to 1.

Fabrication properties were then evaluated in terms of impact resistance, flexibility and adhesion tests. Adhesion was measured as in Example I. Flexibility was tested by forming coated panels into a lock seam; an excellent grade denotes no cracking or other coating failure. The tests were carried out with aluminum panels, one being coated with the composition of this invention, another being coated with a 100 percent poly(vinylidene fluoride) film and a third with the amide interpolymer composition alone. Each was cured at 500° F. for 60 seconds with metal temperatures in the range of 430°–450° F. The results were as follows.

| | Impact Resistance | Flexibility | Adhesion |
|---|---|---|---|
| Coating Composition Containing: | | | |
| 100 percent poly(vinylidene fluoride) | Excellent | Excellent | Poor. |
| 50 percent poly(vinylidene fluoride) 50 percent amide interpolymer | do | do | Excellent. |

Similar panels were employed to evaluate in terms of gloss, mar resistance and surface smoothness to the touch. A standard 60° gloss meter was used to determine gloss. The results follow.

| | Gloss | Mar Resistance | Surface |
|---|---|---|---|
| Coating Composition Containing: | | | |
| 100 percent poly(vinylidene fluoride) | Low | Poor | Rough. |
| 50 percent poly(vinylidene fluoride) 50 percent amide interpolymer (Part A, Ex. I) | High | Good | Smooth. |

Coatings were also applied and baked as above on phosphatized, galvanized steel panels (Bonderite 37). Some of these coatings were tested for corrosion resistance. The panels were coated, baked as above, scoring the coating with an X and exposing it to a 5 percent salt spray at 15° angle at 100° F. for 500 hours. Others were tested for water resistance by scoring and immersing the coating in water at 100° F. for 1,000 hours. The coatings were evaluated by noting the extent of blistering and by testing for adhesion using pressure-sensitive tape, as described above. The results were as follows.

|  | Adhesion | Blistering |
|---|---|---|
| Coating Composition Containing: | | |
| 100 percent poly(vinylidene fluoride) | Poor | Moderate. |
| 50 percent poly(vinylidene fluoride) 50 percent amide interpolymer | Good | None. |

For the water immersion tests, the panels were prepared as in the salt-fog test. The panels were placed in a water bath at 100° F. for 1,000 hours. The results follow.

|  | Adhesion | Blistering |
|---|---|---|
| Coating Composition Containing: | | |
| 100 percent poly(vinylidene fluoride) | Poor | Moderate. |
| 50 percent poly(vinylidene fluoride) 50 percent amide interpolymer | Good | None. |

EXAMPLE IV

This example illustrates the advantages gained by the coating compositions of this invention by means of employing amide interpolymers containing acrylonitrile monomers.

Two coating compositions were prepared as in Example II except that 50 parts of the amide interpolymer and 50 parts of poly(vinylidene fluoride) were employed and the pigment was dispersed in the composition in a pigment-to-binder ratio of 0.8 to 1. In the first composition, the amide interpolymer contained the following monomers:

| | Parts by percent |
|---|---|
| Acrylamide | 5.0 |
| Methacrylic acid | 3.0 |
| Acrylonitrile | 25.0 |
| Ethyl acrylate | 67.0 | and in the second composition, the amide interpolymer contained the same monomers except that styrene was substituted for acrylonitrile, the same proportions being used throughout in both interpolymers. The coatings were then applied to steel panels and subjected to impact and immediately thereafter tested for adhesion. The impact and adhesion tests were the same as those used in Example III. The results follow.

| Coating composition containing: | Impact and adhesion |
|---|---|
| 50 percent poly(vinylidene fluoride), 50 percent amide interpolymer without acrylonitrile | Good. |
| 50 percent poly(vinylidene fluoride), 50 percent amide interpolymer with acrylonitrile | Very good. |

EXAMPLE V

Example III was repeated, except that the amide interpolymer employed was produced from the following reactants, solvents and catalyst, using the above-described procedures:

| | Parts by weight |
|---|---|
| Acrylamide | 180 |
| Methacrylonitrile | 360 |
| Methyl methacrylate | 450 |
| Ethyl acrylate | 769 |
| Methacrylic acid | 45 |
| Alpha, alpha'-azo-bisisobutyronitrile | 27.3 |
| Xylene | 477 |
| n-Butanol | 835 |
| Aromatic naphtha | 577 |
| Diacetone alcohol | 550 |
| Formaldehyde solution (40 percent in n-butanol) | 375 |
| Maleic anhydride | 4.8 |

The product had a solids content of 46 percent and a Garder-Holdt viscosity of Y.

This polymer when employed as in Example III had excellent compatibility with poly(vinylidene fluoride) and provided coatings of similar properties to those described.

EXAMPLE VI

This example illustrates the use of an organosilicon-modified amide interpolymer, produced using the following initial reaction mixture:

| | Parts by weight |
|---|---|
| Acrylamide | 135 |
| Methacrylic acid | 30.5 |
| 2-hydroxyethyl methacrylate (30 percent solution in xylene) | 225 |
| Styrene | 370 |
| Methyl methacrylate | 405 |
| Ethyl acrylate | 334 |
| Organopolysiloxane | 450 |
| Butanol | 550 |
| Xylene | 968 |
| t-Dodecyl mercaptan | 40 |
| t-Butyl peroxyisopropyl carbonate (catalyst) | 0.83 |

The organopolysiloxane was an intermediate type, phenylsubstituted siloxane (Dow-Corning Z-6018) having an average molecular weight of about 1600 with an average of about four hydroxyl groups per molecule. The above mixture was refluxed while removing evolved water. After 2 hours, 0.83 part of catalyst in 23 parts of xylene were added, and after 2 more hours 0.8 part of maleic anhydride and 280 parts of a 40 percent solution of formaldehyde in n-butanol were added. Refluxing was continued and over the next six hours, a solution of 0.8 part of catalyst in 140 parts of xylene was slowly added, after which refluxing was continued one more hour and then 370 parts of xylene were added. A total of 65 parts of water were removed. The product had a solids content of 45 percent and a Gardner-Holdt viscosity of J.

Twenty-five parts of the above product (45 percent solids) was mixed with 55 parts of TiO$_2$ and 20 parts of isophorone and ground to a fine paste. There were then added 86 parts more of the interpolymer solution, 50 parts of powdered poly(vinylidene fluoride) and 101 parts of isophorone. The coating composition thus obtained was coated on treated aluminum to give a 1 mil thick dry film and baked at 350° F. for 30 minutes. The coating had a smooth, glossy appearance with good adhesion and excellent durability.

As an alternative to the above example, the amide interpolymer can be prepared omitting the organopolysiloxane, which is then added in formulating the coating composition. Such a product also has desirable properties.

EXAMPLE VII

This example illustrates the use of an organosilicon precondensate in producing an organosilicon-modified amide interpolymer for use in the invention.

The following were refluxed for 1½ hours while removing evolved water:

| | Parts by weight |
|---|---|
| Organopolysiloxane (as in Example VI) | 499 |
| 2-hydroxyethyl methacrylate | 55.5 |
| Xylene | 138.5 |

The condensate produced was employed in making an amide interpolymer from the following reactants (catalyst, solvents and procedure similar to Example VI):

| | Parts by weight |
|---|---|
| Acrylamide | 100 |
| Methacrylic acid | 25 |
| Acrylonitrile | 200 |

|  | Parts by weight |
|---|---|
| Styrene | 250 |
| Butyl acrylate | 425 |
| Organosilicon condensate | 415 |
| Formaldehyde solution (40 percent in butanol) | 210 |

The product, when formulated in a coating composition with poly(vinylidene fluoride), as in Example VI, provided coatings of similarly outstanding properties.

Similar results to those shown are obtained using other amide interpolymers of the class described in place of those in the foregoing examples. Also, copolymers of vinylidene fluoride can be employed instead of poly(vinylidene fluoride) with results that are satisfactory for many purposes. Other materials, such as the resinous products mentioned hereinabove can be added to the compositions as illustrated if desired. In some instances, it is desirable to apply the coating compositions herein over a primer coating. This is particularly true when increased corrosion resistance is required, in which case a corrosion-resistant primer is utilized.

According to the provisions of the patent statutes, there are disclosed above the invention and what are now considered to be its best embodiments. However, it is to be understood that, within the scope of the appended claims, the invention may be practiced otherwise than as specifically described.

We claim:

1. A coating composition comprising (1) a polymer of vinylidene fluoride, and (2) an aldehyde-modified interpolymer of from about 2 to about 50 percent by weight of a polymerizable unsaturated carboxylic acid amide and at least one other copolymerizable ethylenically unsatturated monomer wherein said interpolymer is characterized by containing amido groups derived from said amide with at least one amido hydrogen atom replaced by the structure:

wherein R is a member selected from the class consisting of hydrogen and hydrocarbon radicals, and $R_1$ is a member selected from the class consisting of hydrogen and a radical derived by removing the hydroxy group from an alcohol.

2. The composition of claim 1 wherein at least about 50 percent of the amido groups have a hydrogen atom replaced by the structure $—CH_2OR_1$, wherein $R_1$ is an alkyl radical containing from 1 to 8 carbon atoms.

3. The composition of claim 1 wherein at least one of the monomers is acrylonitrile or methacrylonitrile.

4. The composition of claim 1 wherein the polymer of vinylidene fluoride is poly(vinylidene fluoride).

5. The composition of claim 1 wherein the amount of the polymer of vinylidene fluoride component is between about 25 percent and 98 percent by weight.

6. The composition of claim 1 wherein the amount of the polymer of vinylidene fluoride component is about 50 percent by weight.

7. The composition of claim 1 in which said interpolymer is an interpolymer of acrylamide and at least one other copolymerizable ethylenically unsaturated monomer, said interpolymer containing from about 2 percent to about 50 percent by weight of acrylamide in copolymerized form, based upon the total weight of said interpolymer, and being characterized by containing amido groups derived from said amide with at least one amido hydrogen atom replaced by the structure $—CH_2OR_1$, where $R_1$ is an alkyl radical containing from 1 to 8 carbon atoms.

8. The composition of claim 7 in which said interpolymer comprises acrylamide, acrylonitrile or methacrylonitrile, and at least one other monomer and $R_1$ is butyl.

9. The composition of claim 1 containing an added resinous component.

10. The composition of claim 9 in which said added resinous component is an organopolysiloxane resin.

11. The composition of claim 10 in which said organopolysiloxane resin is interreacted with the interpolymer of an unsaturated carboxylic acid amide.

12. An article comprising a metal surface having thereon an adherent cured coating of the composition of claim 1.

13. An article comprising a metal surface having thereon an adherent cured coating of the composition of claim 7.

References Cited

UNITED STATES PATENTS

| 2,870,116 | 1/1959 | Vogel | 260—853 |
|---|---|---|---|
| 3,230,204 | 1/1966 | Chloupek | 260—72 |
| 3,240,744 | 3/1966 | Kusiak | 260—31.8 |
| 3,253,060 | 5/1966 | Koblitz | 260—900 |
| 3,261,881 | 7/1966 | Christenson | 260—826 |
| 3,271,479 | 9/1966 | Vogel | 260—898 |
| 3,304,278 | 2/1967 | Hauptschein | 260—29.6 |
| 3,318,971 | 5/1967 | Chloupek | 260—826 |
| 3,324,069 | 6/1967 | Koblitz | 260—900 |

SAMUEL H. BLECH, *Primary Examiner.*

PAUL LIEBERMAN, *Assistant Examiner.*

U.S. Cl. X.R.

117—132; 260—15, 17, 39, 41, 827, 834, 837, 849, 851, 853, 856, 873, 897, 899, 900